(12) United States Patent
Wiegenstein et al.

(10) Patent No.: US 10,481,981 B2
(45) Date of Patent: Nov. 19, 2019

(54) SYSTEM AND METHOD FOR AUTOMATIC CORRECTION OF A DATABASE CONFIGURATION IN CASE OF QUALITY DEFECTS

(71) Applicant: Virtual Forge GmbH, Heidelberg (DE)

(72) Inventors: Andreas Wiegenstein, Mannheim (DE); Joachim Ritter, Weimar (DE); Thomas Kastner, Sinsheim (DE); Markus Schumacher, Einhausen (DE)

(73) Assignee: Virtual Forge GMBH, Heidelberg (DE)

( * ) Notice: Subject to any disclaimer, the term of this patent is extended or adjusted under 35 U.S.C. 154(b) by 604 days.

(21) Appl. No.: 13/921,834

(22) Filed: Jun. 19, 2013

(65) Prior Publication Data
US 2014/0379664 A1    Dec. 25, 2014

(51) Int. Cl.
| | | |
|---|---|---|
| *G06F 17/30* | (2006.01) | |
| *G06F 11/14* | (2006.01) | |
| *G06F 11/30* | (2006.01) | |
| *G06F 21/57* | (2013.01) | |

(52) U.S. Cl.
CPC ...... *G06F 11/1402* (2013.01); *G06F 11/3006* (2013.01); *G06F 11/3051* (2013.01); *G06F 21/577* (2013.01)

(58) Field of Classification Search
CPC .............................. G06F 17/30; G06F 11/1402
USPC .......................................................... 707/687
See application file for complete search history.

(56) References Cited

U.S. PATENT DOCUMENTS

| | | | | |
|---|---|---|---|---|
| 6,704,737 | B1 * | 3/2004 | Nixon ................ | G05B 19/4145 707/656 |
| 8,782,201 | B2 * | 7/2014 | Kephart ................ | G06Q 10/06 705/7.28 |
| 2005/0132228 | A1 | 6/2005 | Ende | |
| 2007/0168874 | A1 * | 7/2007 | Kloeffer ................ | G06Q 10/06 715/764 |
| 2008/0086660 | A1 * | 4/2008 | Wefers ................ | G06F 11/3688 714/37 |
| 2009/0131038 | A1 * | 5/2009 | MacNaughtan ...... | H04W 24/02 455/422.1 |
| 2010/0031076 | A1 * | 2/2010 | Wan .................... | G06F 11/3062 713/340 |
| 2011/0023070 | A1 * | 1/2011 | Vare .................... | H04N 21/235 725/62 |
| 2013/0174263 | A1 * | 7/2013 | Nunez Di Croce .................. | H04L 63/1433 726/25 |

(Continued)

OTHER PUBLICATIONS

Chuprunow et al., Mit Schwachstellen umgehen und sie unter Kontrolle halten [Addressing vulnerabilities and keeping them under control], reprint from a special issue of "SAP & Sicherheit" ["SAP & Security"] of Oct. 4, 2011.

(Continued)

*Primary Examiner* — Hicham Skhoun
(74) *Attorney, Agent, or Firm* — Caesar Rivise, PC

(57) ABSTRACT

The present invention refers to a system, a method and product for automatically identifying quality defects in configuration parameters of a database system and for automatically correcting them according to predefined quality procedures. The method is executed on a central server (12) and on several satellite systems (10) as well. The method may be integral part of an enterprise resource planning system.

27 Claims, 7 Drawing Sheets

(56) References Cited

U.S. PATENT DOCUMENTS

2014/0189046 A1* 7/2014 Vezzuto ............... H04L 67/108
                                                          709/217

OTHER PUBLICATIONS

Wiedemann et al., Sicherheitslücken und Hintertüren im ABAP-Code [Vulnerabilities and Backdoors in ABAP Code], S@PPORT, Reprint from Issue 5 (May 3, 2012).

* cited by examiner

SYSTEM AND METHOD FOR AUTOMATIC CORRECTION OF A DATABASE CONFIGURATION IN CASE OF QUALITY DEFECTS

TECHNICAL FIELD OF THE INVENTION

The present invention relates to dynamic and automatic correction of a configuration of a distributed database system in order to identify quality risks and to automatically generate recovery procedures in order to mitigate these risks.

BACKGROUND

Most technical development and production usually relies on electronic systems using database technology to manage their key business processes. An example of this type of system would be an Enterprise Resource Planning (ERP) system. Software products may relate to SAP NetWeaver-based solutions and the SAP R/3 platform or to Oracle-related products.

These systems are in charge of processing sensitive business data and, accordingly, the confidentiality, integrity and availability of this information is therefore critical for the security and continuity of the business. Moreover, all security relevant data of a company or an application is provided in the database system. Therefore, reducing the risk of security leaks or compliance breaches in the database system is a major concern.

Operating a database system, such as an SAP® system, necessitates a plurality of technical configurations, like, for example, configurations relating to password protection (minimal and maximal password length, etc.), network connections, encryption and decryption procedures, management of access rights, etc. These configurations are set on an application level and typically at the user's site in order to adapt the database system to the specific needs of the business case (customization). Incorrect, missing or critical configuration settings may lead to severe quality and security risks.

It is therefore necessary to check these configuration settings. Typically, there are more than 3000 configuration parameters to be set and various tables to be analyzed for this purpose. A manual check is very expensive and problematic, also because interdependencies between different configuration parameters have to be considered, as well. For this reason, an automatic checking tool which automatically detects defects of quality requirements and security leaks and which issues concrete instructions in order to automatically correct the relevant configuration parameters (by indicating which configuration parameter has to be set or amended in which way) would be helpful.

Further, it has to be taken into account that an SAP system usually has different security zones, i.e., domains in which different security requirements may exist in parallel. For example, personal data of the company's employees are to be processed with a higher degree of security than stock-keeping data. Therefore, there is a need for a product which takes into account different security zones during checking of configuration settings.

Another aspect is to be seen in that new business requirements and amended customizations (by the SAP customers) of the database system, typically, affect configuration settings. Thus, there is a need that analysis of the configuration state of the database system is to be executed repeatedly and/or periodically even after installation and during operation of the database system.

SUMMARY OF THE INVENTION

The present invention refers to a method, system or apparatus and computer program product for providing automatic identification of quality and security violations in database configurations and an automatic correction mechanism for incorrect or critical configurations. The present invention therefore refers to a dynamic configuration analysis, i.e., during operation of the database system.

According to an aspect, the present invention refers to a computer-implemented method to be applied in an enterprise resource planning (ERP) system for transferring a database system with a central server and at least one satellite system in a secure and stable configuration state, comprising the steps of:

Measuring a plurality of configuration parameters on the at least one satellite system, wherein the configuration parameters are stored in the database or in at least one configuration file or are measured online, and are accessed centrally by means of database internal interfaces (API) for consolidating the measured configuration parameters Providing a test input interface for receiving test data, Centrally analyzing the measured and consolidated configuration parameters with respect to the received test data in order to identify and rank configuration quality defects and in case of at least one identified configuration quality defect:

Transferring the database system in a secure and stable configuration state by automatically generating correction instructions based on the identified configuration quality defects for correcting configuration parameters to be executed on the respective satellite wherein the method is executed as integral part of the database system.

One major aspect of the present invention is the automatic correction of wrong, risky or missing configurations in a database. Particularly, the configuration state on the satellite systems is detected, analyzed and corrected. Thus, an essential issue of this invention relates to verifying and checking a security and quality level of the database system, which is a SAP-System and automatic recovery measures. The method according to the present invention may be applied to SAP Netweaver Basis and Netweaver Business Suite.

It has to be noted that the present invention does not analyze database customization code (like ABAP code) in a static manner (no static code analysis). By contrast, the present invention refers to a dynamic analysis and does relate to an operation of the database system (or modifications and extensions thereof). The method described in this application is performed by executing or operating the database system on a real or virtual processor. The dynamic analysis is based on the operation or behavior of the target's system. In order to produce interesting behavior and to get a high test coverage, the set of test cases and conditions are pre-defined with sufficient test inputs.

Each analyzing and correction run is documented in a dedicated log-file.

According to an aspect, the present invention is based on a target/actual comparison. It has to be noted that this comparison is not only used for identifying quality defects or security violations, but is further used for automatically generating corrections instructions to be sent to the satellites in order to automatically correct the identified wrong, risky or missing configuration settings.

According to a further aspect, the step of measuring a plurality of performance configurations may be executed periodically or interactively. This has the advantage that a statistical analysis may be executed and measurement failures may be reduced and avoided (for example, if a network failure results in an aborted transmission of measurement signals to the server).

In a preparation phase, a quality policy or different quality policies are pre-defined. The analysis and the automatic correction are based on these configurable policies. These policies are implemented in a set of test cases, which are pre-defined and may be amended individually by the customers or users during application of the system. The quality policy defines several quality-related parameters, comprising a security level, which may be different for the various satellites. Further, the quality policy defines the thresholds that indicate a quality defect and/or the setting(s) to be used for correction. These quality-related parameters are also used to build the individual textual descriptions for each quality violation, as well as for the correction instructions. Further, the quality policy can be enhanced with white lists and black lists that define exceptions for the analysis, as well as values ranges for testing.

According to a further aspect, the system architecture is modular and extendable so that new test scenarios may be added or configuration rules may be amended according to specific case requirements. This has the advantage that the configuration correction system may be customized to the specific needs.

The present invention allows checking SAP NetWeaver-based systems. The checking or security analysis may be executed centrally on a central analyzer or locally on the satellites (distributed computer-based systems) as well.

According to another aspect, the invention may be implemented in a computer program being loadable in a memory of a computer, wherein the computer program is adapted to carry out the steps of the method as mentioned above.

BRIEF DESCRIPTION OF THE DRAWINGS

The figures illustrate principles of the invention according to specific embodiments. Thus, it is also possible to implement the invention in other embodiments, so that these figures are only to be construed as examples. Moreover, in the figures, like reference numerals designate corresponding modules or items throughout the different drawings.

DETAILED DESCRIPTION OF THE DRAWINGS AND PREFERRED EMBODIMENTS

Figure 1:
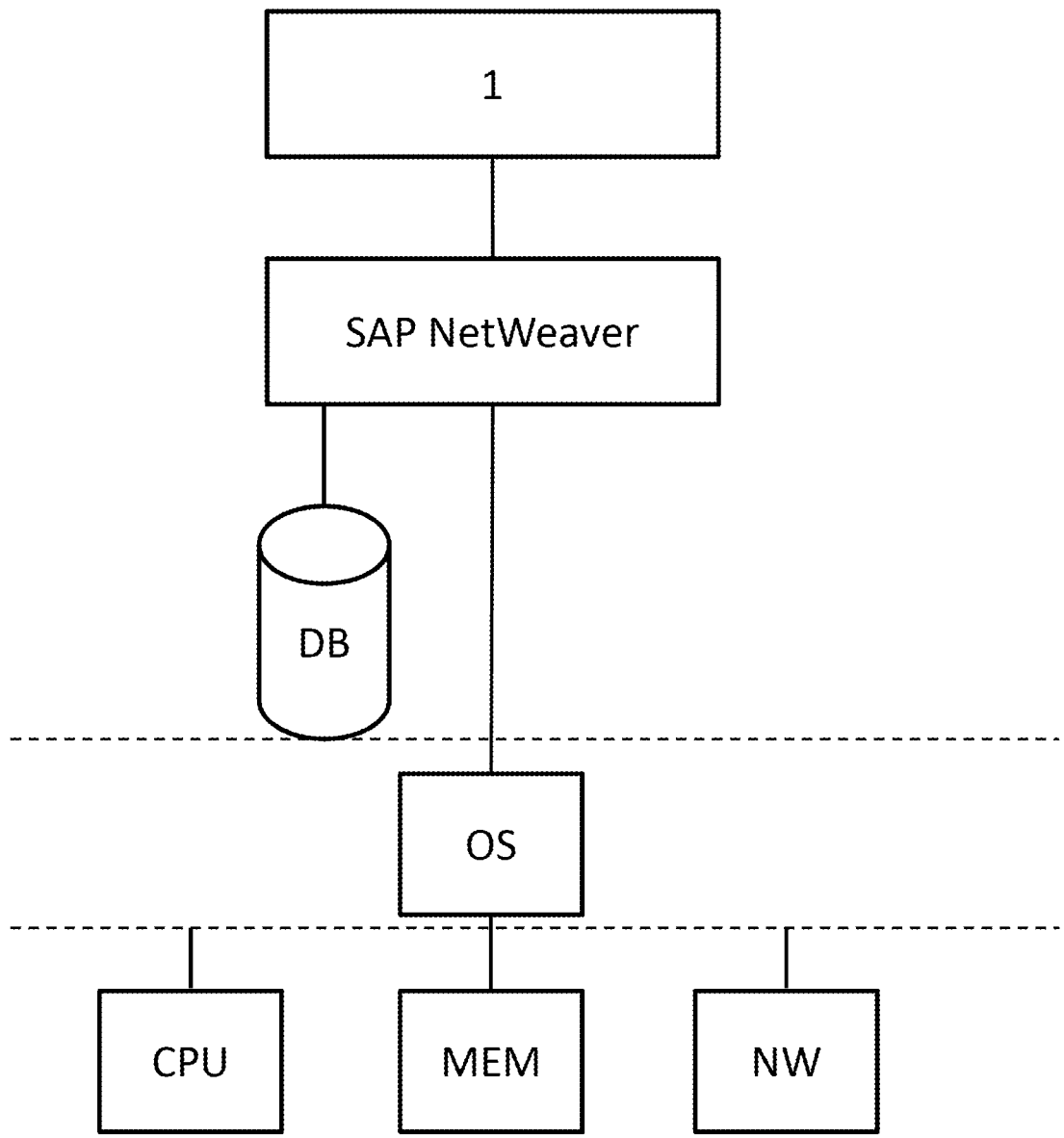
FIG. 1 is a schematic drawing illustrating a database architecture on which the system according to present invention is based.

The present invention relates to a database quality-defect detection and automatic repair tool. Particularly, the present invention relates to a common extendable framework to detect/identify, document (audit-log), mitigate and correct the configuration parameter settings and to prevent misconfiguration.

The present invention particularly refers to methods, systems and software products for transferring a database software system with a central server and at least one satellite system in a secure and stable configuration state. This transformation is performed by measuring actual configuration parameters on the satellite systems and analyzing the same with respect to quality defects (inspection run). If any quality relevant misadjustment of a configuration parameter has been identified, the defect is reported by an automatically generated report and a specific remedy procedure is initiated (correction run). The remedy procedure is generated and may be executed automatically or in response to a user verification signal. Then, an automatic recovery mechanism is executed, which may be performed without any user interaction. The automatic configuration correction procedure uses integral parts of the database system so that internal database interfaces, infrastructure and platforms may be used for data exchange.

One preferred embodiment of present invention is a software program that is integral part of a database system and comprises or executes the following steps:

Measuring a plurality of configuration parameters on the at least one satellite system, wherein the configuration parameters are stored in a database or in at least one configuration file or are measured online, and are accessed centrally by means of database internal interfaces (API or audit-conform procedures) for consolidating the measured configuration parameters Providing a test input interface for receiving test data, Centrally analyzing the measured and consolidated configuration parameters with respect to the received test data in order to identify and rank configuration quality defects and in case of at least one identified configuration quality defect:

Transferring the database software system in a secure and stable configuration state by automatically generating correction instructions for correcting identified configuration parameters to be executed on the respective satellite, wherein the correction instructions are generated by processing the configuration parameters which have been identified to show a quality defect and the test data wherein the method is executed as integral part of the database system.

In the following, a short explanation and definition of terms used in this disclosure is given.

The central server and the satellites are computer-based instances, which are connected over a network (for instance, in a SAP system, a LAN network is used; however, in other embodiments also other networks, like public networks such as the Internet, may be used). The central server and the satellites are part of a database system and/or may comprise a database system themselves. The database systems may be monitored and checked whether there are security violations or quality defects. The system to be monitored may be the central server or at least one of the satellites. Usually, a set of satellites is connected to the system. However, it is also possible that only one satellite interacts with the central server. In both cases, it is possible to monitor (i.e., to check for quality defects) the respective system (server and/or satellite). In a preferred embodiment, a set of satellites is monitored in parallel.

The method and system according to the present invention refer to identifying quality defects of a database system and to correct the same by accessing a knowledge database with pre-defined rules for automatic correction. Due to the automatic correction, an actual database state (not necessarily perfect and quality defect free) is transferred in a secure and stable configuration state. In this respect, the term "secure and stable" refers to all of the aspects mentioned hereinafter, namely to security, performance, robustness, maintainability and compliance. Other embodiments refer to another definition of "secure and stable" and possibly may only refer to a subset of the before-mentioned aspects. The term "quality" usually comprises all of the above-mentioned aspects. However, in a less complex embodiment, it is possible that quality only refers to one or more of the single aspects mentioned above (performance, robustness, maintainability, compliance, security).

In a preferred embodiment, a database system, particularly an enterprise resource planning system, is to be monitored with respect to configuration quality. The term "enterprise resource planning system" (ERP-system) is to be construed as a computer-based database system for managing and planning all resources within an enterprise. There exist different types of ERP-systems, like a supplier relationship management (SRM), a supply chain management (SCM), a customer relationship management (CRM) and others. The present invention relates to an SAP® database system which is operated by a NetWeaver platform. Other embodiments refer to a SAP R/3 platform. According to the invention, generally SAP Servers may be analyzed that are based on an ABAP architecture or on a Java architecture.

The term "measuring" refers to an automatic detection of measurement signals. The measurement signals are detected on the system(s) to be monitored, which may be the central server and/or at least one of the satellites. Measurement signals may refer to configuration parameters which are actually set on the respective system to be monitored, i.e., on the satellite. The configuration parameters may be stored in the database or in at least one configuration file or may be resident in the main memory of the system to be monitored. The configuration parameters are detected online during operation of the database. Typically, measuring is executed automatically and without user interaction.

The term "configuration parameters" generally refers to all parameters which may be set and configured for a database configuration. Configuration parameters may be password-related parameters, access right-related parameters, network connection-related parameters etc. For example, for configuring a database system the administrator may set the configuration parameter "password-length" with the value "7". Further, he may configure other parameters, urging a user to input a password with a specific amount of non-digit and extra-characters, etc. As described above, configuration parameters preferably relate to security, performance, robustness, maintainability and/or compliance of the system to be monitored (for example, a respective satellite or a set of satellites). Examples of configuration parameters, their category and their storage, as well as a rule for analyzing this parameter and rules for correction or mitigation, are given in the table below:

| Parameter | Category | Storage | Rule for evaluation | Correction / Mitigation |
|---|---|---|---|---|
| Password Length | System profile parameter | Profile file (Operating system) | Value >= n, Good case | Changing actual parameter value to target value |
| User with critical authorization for specific applications ("install program") | Authorizations | User data (database) | Number of found users with critical authorization assigned = 0 (without whitelist users), Good case | Locking of the respective users |
| Users, who didn't change their password for n days | User management | User data (database) | Today—password change date < n, Good case | Locking of the respective users |
| Controlling access rights for external programs | Communication interfaces | Access control files (Operating system) und profile file (Operating system) | Complex evaluation rule, coded | Generation of a default access rights list; changing parameters to target values |
| Programs without access right group | access rights | Program file (database) | Number of found programs = 0, Good case | Setting a default access rights group |
| Version of system components | System | System files (Operating system) Component's directory (database) | Version > x, Good case | — |

The term "consolidating" is to be construed in the sense of aggregating the measured configuration parameters centrally. Typically, consolidating is executed on the central server. Test data comprise test cases to be executed on the system to be monitored. However, test data may additionally comprise metadata, relating to a test scope, a duration of the test, target specific metadata, etc. Moreover, test data may comprise the tests or the set of tests to be executed, and data to customize a test scope and a correction scope and pre-defined criteria, rules and target values for the configuration parameters.

The term "analyzing" refers to computing an intermediate result, referring to the identification of configuration quality defects. The intermediate result may be a set or a list of identified defects. The identified quality defect(s) may additionally be ranked or prioritized. The ranking may be based on a predefined policy. The step of analyzing is typically executed by accessing a knowledge database. The knowledge database stores so called "best practice cases" for specific configuration settings. The knowledge database serves for storing reference values for configuration parameters. The reference values serve as target values for the configuration parameters and are known to lead to a proper secure and stable database operation in a specific context and setting, taking into account an overall configuration state. It has to be noted that, hence, also interdependencies between different configuration parameters are considered in the best practice cases. For example, if configuration parameter A is set to value x, this setting may result in side-effects for other configuration parameters B, C, which then have to be set to other values. These interdependencies are considered in the knowledge database and in the reference values for target configuration parameters. Also interdependencies between configuration parameters for different satellites may be taken into account in order to evaluate an overall setting of the database system.

The term "finding" refers to one or more configuration parameters which do not conform to the predefined quality policy. Thus, for example, the identified configuration parameter may lead to a security violation or may result in quality defects. A finding, however, may also refer to a correct setting of a configuration parameter, if considered separately, but which has to be amended, because the value may conflict with other configuration parameter settings, which are to be analyzed, too. Thus, a finding does not only refer to critical, incorrect or missing configuration parameters, but also refers to parameters which have to be amended in the context of an overall evaluation of all configuration parameters. Typically, the satellite system is considered here as a separate instance, so that the analysis is satellite-specific. However, in a more complex embodiment, it is also possible to take into account all satellites and all configuration settings of these satellites. For a person skilled in the art, it is clear that the scope of present invention is not limited to specific configuration parameters or a specific number of identified quality defects. Thus, a finding may only comprise one configuration parameter or a set of parameters. It is also possible that no quality policy violations are found and the test cases could be executed successfully. In this case, the intermediate result may also comprise of a message "test: successful".

A major aspect of present invention is to be seen in that correction instructions are generated automatically for correcting the identified quality defects and for re-setting the respective identified actual configuration parameters. Typically, the correction instructions are to be executed on the respective satellite or on the system to be monitored. According to a first aspect, the correction instructions comprise automatic database commands (by directly executing a WRITE access to the database or to a file or by means of API's in order to re-configure configuration parameter values) which may be executed automatically. In this embodiment, the findings may be corrected only by one single user interaction, particularly by clicking on a button of a user interface of present system. According to another aspect, the correction instructions comprise a human-readable list with concrete and precise instructions, which element or button on a user interface is to be set in which way and which sequence of steps is to be executed. The steps may be executed manually (for example, by an operator on the satellite system).

It has to be noted that the automatically generated correction instructions are based on the analysis of the measured and consolidated configuration parameters. Further, the generation of the correction instruction is based on the received test data. The test data may comprise a test policy and a quality policy. This has the advantage that the correction instructions are generated specifically for the respective satellite so that also satellite specific aspects may be taken into account (for example, restricted network or processing resources, etc.). Therefore, a more preferred embodiment of the present invention is to be seen in that the test data are defined dynamically with respect to the specific application scenario. Thus, it might be possible to define other test cases or test data for a first satellite than for a second satellite. The test cases may be extended, amended, replaced also during operation of the system using customization (by means of configuration and coding). Test cases are implemented in software modules to be executed on the system to be monitored.

According to an embodiment of present invention, the inspection runs may be triggered or initiated manually or automatically (at pre-definable and configurable time slots).

All inspection results are consolidated and stored and may be used for further (i.e., statistical) analysis. This has the advantage that it is possible to track all configuration parameter settings and changes over time and to analyze system's security and stability over time.

Further, it is possible to use the pre-configured test data which are provided by the system or to use specific user-programmed test logic, which extends the test scope of the inspection tests. A significant advantage is to be seen in that newly incorporated test logic (or test cases) may also be provided directly on the respective satellite.

According to an aspect the central server may be a primary database and a satellite may be a secondary database system and may consist of a plurality of computer based instances.

A satellite system or the database system is an ERP system (ERP: Enterprise Resource Planning system) that is to be monitored and which is usually connected to the central server. If the central server is to be monitored, it is also treated as a satellite in this context. According to another aspect a satellite may be another type of database system like a Supplier Relationship Management System (SRM), Supply Chain Management System (SCM), Customer Relationship Management (CRM) System. The method and system according to present invention is based on a SAP NetWeaver platform.

The analyzer may be a computer-based processing unit, which is located on a central database system. However, it is also possible to implement the analyzer in a satellite or in another system which is associated to at least one of the database systems.

The identified configuration errors (identified by means of the analyzer) may be handled in different ways.

A first embodiment refers to an automatic system correction which is executed in the correction module. The correction module is adapted to automatically generate instructions to amend the wrong and inconsistent configuration parameter settings to correct ones. The correct parameter settings are calculated on the basis of reference values, which are defined in the preparation phase. This means that in case the results are a set of findings or include highly complex mitigation setting, users can filter and/or modify the specific corrections to be executed on the satellite in a preparation step. In this first embodiment, the identified configuration misadjustment(s)—if any—are reported to a user (over a user interface). In case there is no misadjustment, the user may configure in a preparation phase to be informed about "Test successful—no failures" as well or otherwise he may select to only be informed in case of errors. The intermediate result of the method relates to a kind of failure report. After this, the identified configuration misadjustments are automatically forwarded to the correction module.

A second embodiment refers to a semi-automatic correction mechanism. Here, a sequence of instructions is generated automatically, which are to be performed on the satellite in order to mitigate the configuration failure. This sequence of instructions may be outputted on a user interface (for instance, in the form of a list) in order to inform the user about necessary steps and actions. He may then choose between at least two options: He may select the automatic correction mode, as described above. Alternatively, he may select to manually execute the instructions on his own. In a third scenario, the correction may consist of both automatic as well as manual corrections, e.g., if the individual corrections can be done automatically, but a user needs to restart the system afterwards (for instance, specific profile parameters do not become active before the system is restarted). In each case the user is informed about precise actions to take, specifying the respective new and correct value of the concrete configuration parameter and how to correct the same by means of specific database commands.

According to an aspect of the present invention, the satellite systems are grouped or categorized according to their respective risk levels via policies. Further, the test cases, test parameters and the correction values for the configuration parameters (target values) are dedicatedly amended with respect to the security and business risks (robustness and performance are to be construed as risks in this context, too). This enables the system to implement the concept that the same technical error (in configuration parameters) may possibly be evaluated differently on two different systems with respect to the risk level. This, in turn, leads to a much better risk evaluation over all distributed satellites.

Present invention is not invasive. This means that for data exchange and detection of input parameters, particularly of configuration parameters on the satellite systems, the present invention does not execute instructions which may be flagged or identified as attacks by database internal or external security systems, like the SAP security audit log or a network intrusion prevention system.

A preferred embodiment of the present invention refers to an analysis of configuration parameters with respect to security and compliance leaks.

In another embodiment, the invention refers to analysis of configuration parameters with respect to robustness and performance and maintainability.

According to an aspect of the present invention, the test data comprise a set of pre-defined test cases, which are dynamically adaptable to the specific use case or extendable.

According to an aspect of the present invention, an intermediate result of the analysis is outputted, wherein the intermediate result comprises a list of findings. The term findings relates here to a set or list (if being ranked) with configuration quality defects. Thus, usually the intermediate result comprises a set of identified and optionally ranked and prioritized (list) configuration quality defects. The intermediate result may further comprise metadata with respect to the analysis (for example: time related data, satellite related data, version data, etc.). As mentioned above, in another embodiment the intermediate result may also consist of a "test successful message" in case no risky configuration setting has been identified in order to provide the user or other instances with this information. The intermediate result may be forwarded to other computing devices for further processing.

Preferably a pre-checking module for evaluating a relevance of a specific test case for a specific satellite is provided. "Satellite" in this respect refers to a remote computer system to be monitored. The satellite may refer to an organization, to an enterprise or a company (unit) or to an application. According to an aspect the satellite is a database system, too. Further, the term may be construed in that the satellite uses or access a (local) database system.

Another aspect refers to providing a post-checking module for identifying and rating interdependency issues that arise in case of a combination of different individual findings. Particularly, if a two or more findings show (negative) side effects and possibly create a further problem. These interdependencies are considered and evaluated. This is due to the fact that many of the settings are unique or are in relation to each other or depend on business processes of the customer's satellite. It is therefore necessary to provide a common check and correction pattern for the configuration parameter settings taken as a whole.

Preferably, automatic correction of the configuration parameters is performed by generating concrete mitigation instructions for the respective configuration parameter to be performed on the satellite system to be monitored. That is to say the instructions specify which of the parameters have to be changed in what way and with which concrete commands and values. The instructions (for instance, comprised in a text file) may be executed automatically or manually.

By default, the configuration parameters do not relate to custom ABAP code and may comprise at least one of following parameters:

Network connection parameters
SAP graphical user interface parameters
Password management parameters
Encryption of network communication parameters, comprising SAP protocols and Web Protocols
Service parameters
Remote function call parameters
User authorization parameters
System setup parameters
Log configuration parameters
Operating system configuration parameters
SAP security patch parameters
System set-up parameters
Log configuration parameters
Database configuration parameters
Operating system configuration parameters.

The intermediate result usually refers to the result of an inspection run on the respective satellite. According to another aspect, the intermediate result also comprises the generated correction instructions before being executed on the satellite. This has the advantage that the intermediate result may be interpreted as an option for (user) verification of the planned corrections before execution. Thus, in case an administrator is of the opinion that the correction run has to be adapted due to, for example, satellite-specific reasons, he may change the intended correction run which may be verified again later before being automatically executed on the respective satellite. Further, the intermediate result may be evaluated and prioritized by a user or automatically based on the pre-defined criteria and rules before being applied on the satellite. The intermediate result and/or the result may be outputted and may be sent as result message to defined recipients. Further, the results and all processes with respect to the secure configuration state transformation are logged in at least one log file. The inspection and correction are evaluated and administered in a central monitoring module.

The identifiable quality defects may relate to:

Critical, inconsistent or incorrect configuration parameters, particularly critical configuration profile parameters or configuration parameters with respect to authorizations of users for specific functionalities and/or access to specific data;

Critical interdependencies between individual configuration parameters. For instance, it is possible that configuration parameter 1 is set with the value "low" and configuration parameter 2 is set with value "high". When evaluated separately (each parameter alone) both parameters are correct, however when evaluated as a whole, then setting "low" of Par1 may conflict with setting "high" of Par2, so that for the overall system an inconsistent and wrong setting has been identified. These interdependencies are evaluated automatically, too. Thus, in this case, a critical interdependency may arise and lead to an overall unsecure or unstable state which is referred to as quality defect and is checked and corrected.

Configuration parameters negatively affecting security of the database software system Configuration parameters negatively affecting compliance of the database software system Configuration parameters leading to a performance reduction lower than a pre-determined lower performance threshold;

Configuration parameters affecting robustness of the database software system and Configuration parameters affecting maintenance of the database software system.

Test data comprise the specific and selected tests to be executed on the respective satellites. Preferably, the tests are satellite-specific.

The communication relating to the transfer of measurement results (measured configuration parameters from the satellites) and transfer of correction instructions is executed by means of a remote function call (synchronously).

Configuration and setput of the satellite system is executed by means of an SAP transport management system (asynchronously).

The inspection and correction system is managed and administered centrally, particularly on a dedicated central server 12.

According to a preferred embodiment the tests comprise:
1. Security Related Tests:
   Password Policy
   User Management
   Authorizations
   Communication
   Patch Management
   SAP Database Security
   Code Integrity
   System Integrity on OS Level
   SAP client configuration
   Forensic (Log configuration)
   Forensic (Log analysis)
   Interaction with local workstations
2. Robustness Related Tests:
   Transactional Database Integrity
   System Integrity Protection (SAP Server)
   System Integrity Protection (Operating System)
   System Integrity Protection (Database Level)
   Interaction with local workstations (compatibility)
3. Performance Related Tests:
   SAP Database Performance
   SAP Server Performance
   Memory Analysis
4. Maintainability Related Tests:
   SAP License Management
   Application Customization.

FIG. 1 shows schematic overview of the system's architecture. The system (and method) for automatically and dynamically identifying and correcting quality defects is depicted in the Figures with reference numeral 1. The system interacts with a middleware component, which may be SAP NetWeaver. NetWeaver is an application platform for consolidating data from heterogene and independent systems on a unitary platform. As can be seen in FIG. 1, the SAP NetWeaver platform interacts with a database DB (which can be any of the databases that are supported for SAP NetWeaver) and an operating system OS, which can be any of the operating systems supported for SAP NetWeaver. A person skilled in the art may understand that the system may comprise a set of (optionally different) databases and a set of (optionally different) operating systems. Although, in FIG. 1, only one database and one operating system are depicted for sake of clearness. In a lower layer, these systems interact with a central processing unit CPU, different memories MEM and network components NW. A person skilled in the art may understand that this level may also comprise other components like registers, ALUs (arithmetic logic unit), microprocessors, control units and others.

Figure 2:
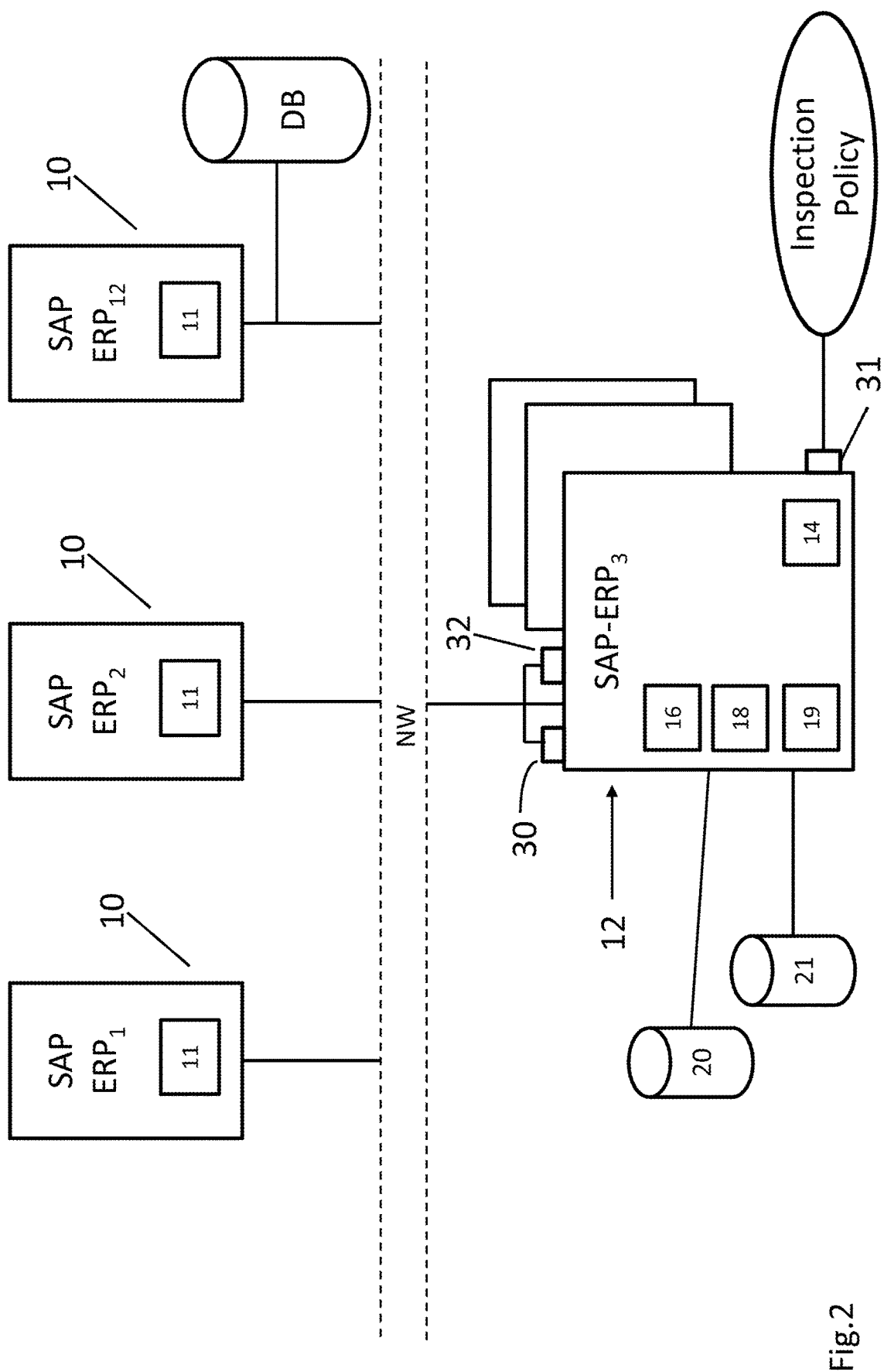
FIG. 2 shows another schematic overview of the system of present invention according to a preferred embodiment.

FIG. 2 shows an overview of a database system, consisting of a plurality of different and distributed enterprise resource planning systems SAP-ERP$_1$, SAP-ERP$_2$, SAP-ERP$_n$. Database systems, like SAP® systems typically consists of central database instances and a plurality of application servers (software systems) that work with their respective database server and are depicted in the Figures with reference numeral 10. The architecture of the invention is such that a designated SAP application server is chosen as the central server that monitors other SAP application servers. These other SAP application servers are referred to as satellites in the context of this invention. For the purpose of monitoring, inspection and correction according to the present invention, they interact with the central server 12 over a network NW (otherwise they behave as an autarkic or self-sustaining system). It has to be noted that at least one of the SAP-systems may be selected to be monitored and that at least one of the SAP-systems has to be designated as central server. The selected system to be monitored is called satellite 10 within this application. However, it is also possible to monitor the central server 12. In this case, the central server is a dual use system and also acts as satellite.

The satellite 10 consists of an engine 11. As may be seen in FIG. 2 a satellite may interact with a local database DB in order to store inspection results, intermediate results, metadata or other correction related data. However, as may be seen in FIG. 2, only one database DB is represented in the figure for the sake of clear arrangement. Thus, typically, each satellite 10 has a local database DB (not represented in FIG. 2 for all satellites). The present invention is not restricted to a specific amount of local databases.

The central server 12 consists of different modules and entities:
- An analyzer, which may also be referred to as a dispatcher 14,
- a result viewer 16,
- a cockpit 18 and
- a findings manager 19.

The central system 12 may comprise of different input/output interfaces, namely a measurement input interface 30, which is adapted for receiving measurement results from the satellite system 10, a test input interface 31 which is adapted for receiving test data, comprising an inspection policy, and one or more database internal interfaces as application programming interfaces (API) 32. The central server 12 may interact with a correction database 20 and a result database 21.

It is possible that the central server 12 or the before-mentioned modules of the central server 12 are virtualized or are distributed among different servers. This aspect should be represented in FIG. 2 by the other instances of the central server 12, shown in a shadowed manner behind the main central server 12 in the form of blank rectangles.

In the preferred embodiment, the central server 12 comprises the analyzer or dispatcher 14, which is adapted for centrally analyzing the measured and consolidated configuration parameters with respect to the received test data, inspection policy in order to identify and rank configuration quality defects. Further, the central server 12 may comprise a correction module 15 which is adapted to transfer the satellite system 10 to be monitored in a secure and stable configuration state by automatically generating correction instructions for correcting the identified (incorrect) configuration parameters to be executed on the satellite system 10. In FIG. 2, the correction module 15 and the dispatcher 14 are architecturally unified in one module or element, which in FIG. 2 is depicted with reference numeral 14.

Figure 3:
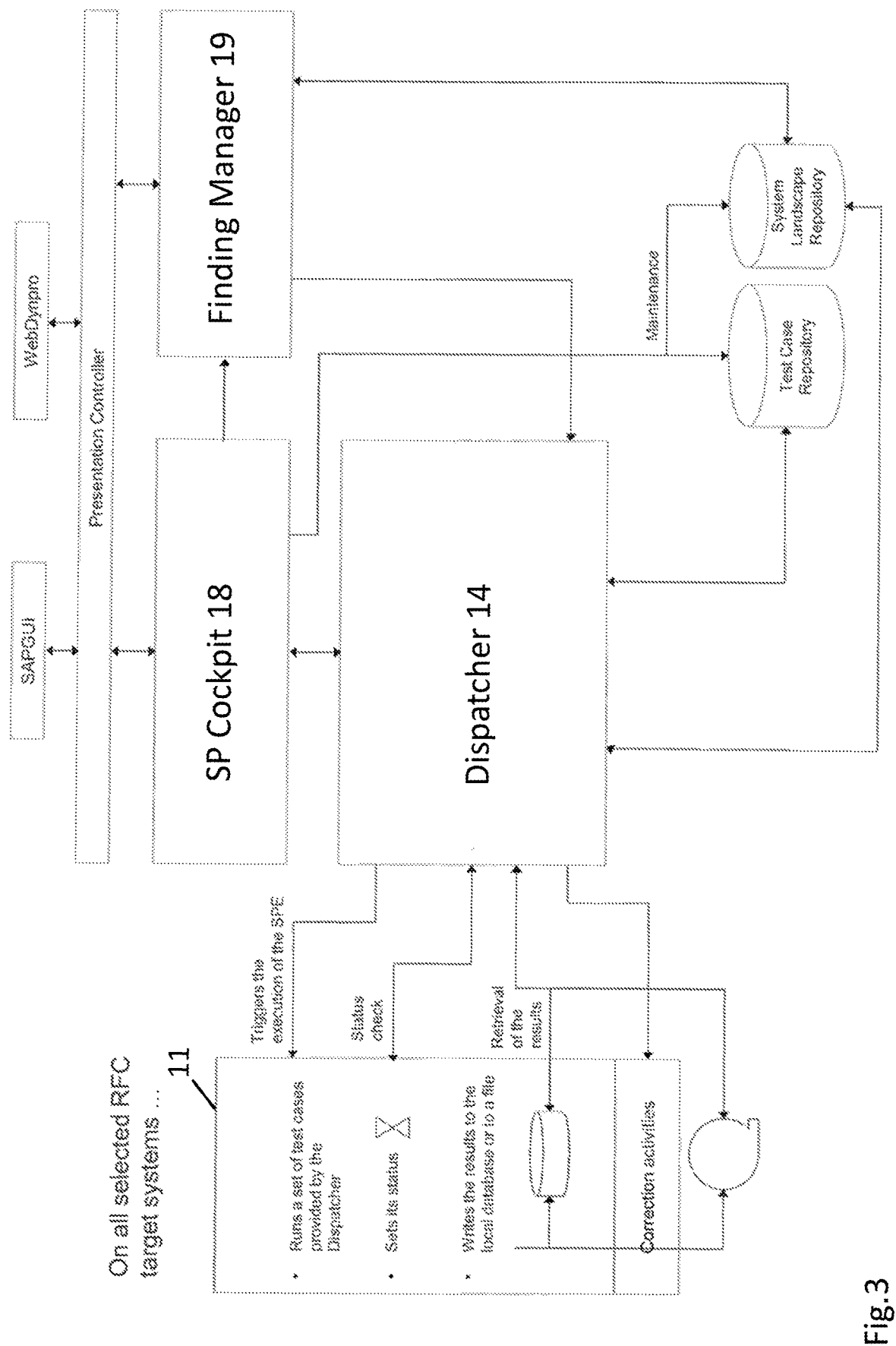
FIG. 3 is an overview of components of the system and their interactions.

FIG. 3 shows another overview of the dynamic and automatic correction system according to the invention. A presentation controller interacts with an SAP graphical user interface (SAPGUI) as a proprietary interface or with another web-based interface WebDynpro, which is a proprietary web application user interface technology developed by SAP AG. The cockpit 18, the findings manager 19 and the dispatcher 14 are part of the central server 12, whereas the engine 11 is part of the satellite system 10 to be monitored and is depicted on the left hand side of FIG. 3.

According to a preferred embodiment, the dispatcher 14 is adapted to determine on which satellite system the engine 11 is to be executed. This has the advantage that it may be configured from which satellite systems 10 configuration parameters should be measured and which satellite system 10 should be monitored. With this feature some satellite systems 10 may be excluded from the inspection and correction run. Further, the dispatcher 14 determines the test cases, which should be executed on the target satellite system 10. Further, the dispatcher 14 triggers the execution of the engine 11 on the satellites 11. Optionally, the dispatcher 14 checks the status of the processing on the remote systems. Finally, the dispatcher 14 retrieves the collected data from the remote satellite systems 10 to be monitored.

The correction module 15, which may be implemented in the dispatcher 14, too, finally triggers the correction activities and procedures on the remote satellite systems 10. Thus, the correction module 15 is adapted for automatically initiating remedy procedures on the satellite systems 10 with respect to the configuration parameters which have been found to be incorrect.

The cockpit 18 is responsible for the user dialog and maintains the respective settings and configurations. Further, cockpit 18 interacts with repository data for variant preparation. Here, parameters are selected which are to be used for inspection. After said selection, the inspection may be started.

An additional component, a monitor, serves to display intermediary and final results and progress of inspection and/or correction runs. Further, the monitor controls the inspection runs and outputs a status and progress of the respective inspection runs. For further analysis, it is possible to evaluate log files and to start a result viewer 16.

The findings manager 19 is also responsible for a user dialog and for displaying the inspection and/or correction result. Further, it is responsible to start the correction run.

The engine 11 is implemented on the respective satellite system (and on each system that should be prepared to be monitored) and is triggered by the dispatcher 14 of the central system 12. The engine 11 runs a set of configurable or predefined test cases provided by the dispatcher 14.

The engine 11 is further adapted to set the status of the respective configuration parameters. Further, it writes the results to the local database DB or to a file. The correction activities are also executed by the engine 11 and are reported to the dispatcher 14.

The inspection and/or correction results are stored in a database or repository for further analysis. For example, statistical evaluation may be executed on these data later. Depending on the respective use case it might be useful to communicate the correction activities and results on the user interface to inform the user (administrator) at the central server 12 about findings, inspection results, intermediate results and correction results. Test cases are stored in a test case repository. The test case repository is depicted in FIG. 3 on the right hand side and stores all of the test knowledge. The test case repository may be extended or amended according to user-requirements. The user may use test classes in order to configure additional test cases (for example, with test for additional profile parameters, which should be analyzed).

For the purpose of maintenance, the cockpit 18 interacts with a system landscape repository, which is also depicted in FIG. 3. In the landscape repository, all data is stored which is necessary to address a target system from the central server 12 and to uniquely identify a target system which should be monitored. According to a further aspect, the landscape repository is adapted to define, which of the set of satellites is to be addressed for inspection and correction and in which manner (with a selection of satellite specific test cases). In this respect it is referred to FIG. 3 with the engine 11, which is titled with "on all selected RFC target systems . . . ", which relates to this aspect. "RFC" refers to remote function call, which is a common feature for a person skilled in the art. As a consequence, by means of the system landscape repository the test or the inspection run may be executed satellite specific and according to rules and requirements, valid for this satellite 10. The term "SPE" (in FIG. 3) refers to system profiler engine, which is abbreviated in this application as engine 11.

Figure 4:
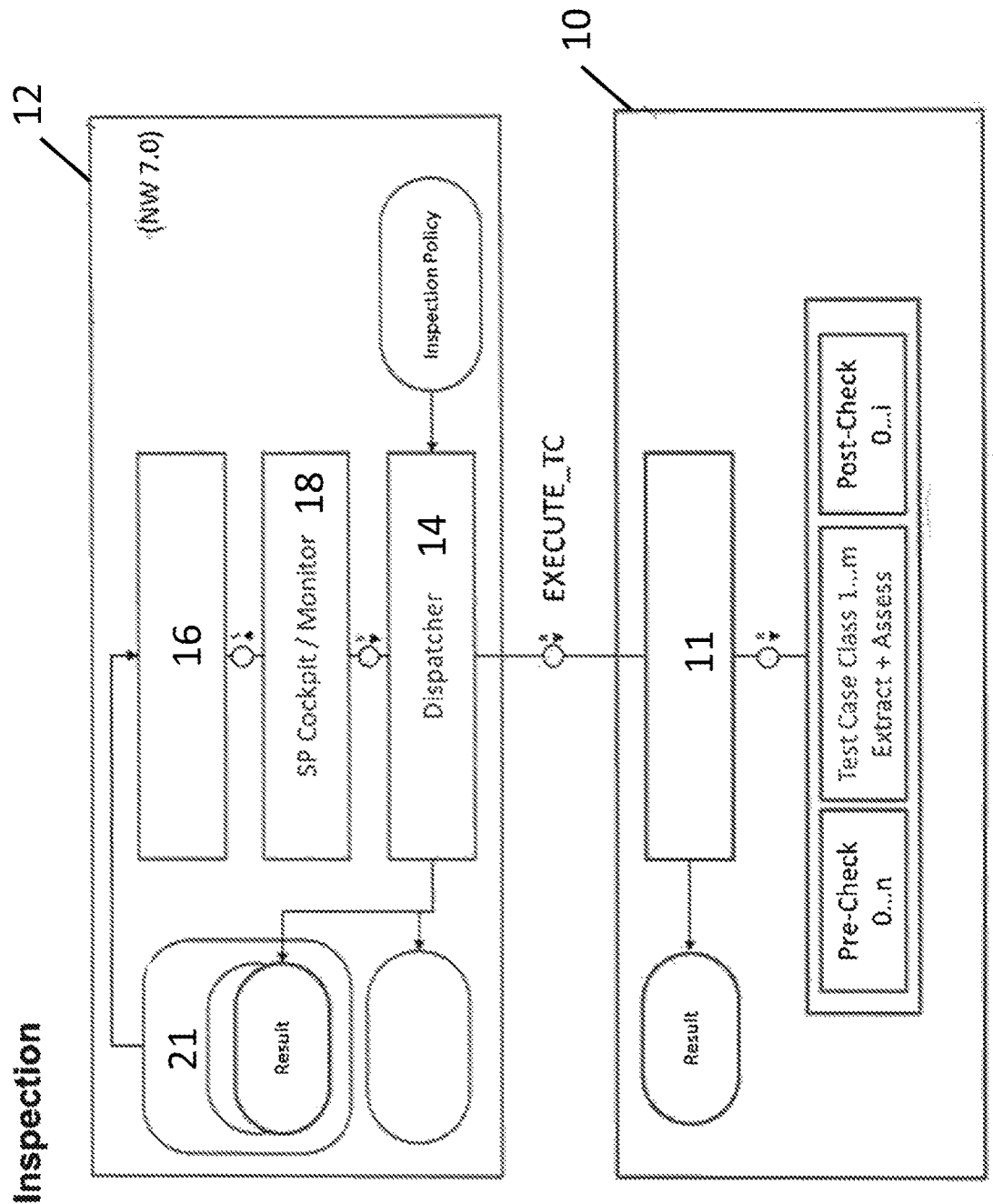
FIG. 4 is a block diagram for an inspection run according to a preferred embodiment of present invention.

FIG. 4 shows a schematic block diagram of an inspection or test case run. After inspection policy has been received by dispatcher 15 and the inspection has been started by the user on the central system 12, the dispatcher 14 initiates an inspection run, which in FIG. 4 is depicted with "EXECUTE_TC". This set of commands is sent to the respective satellite system 10 and to be monitored and received by engine 11. Engine 11 interacts with the satellite system (on which it is installed) and runs several pre-checks. The pre-checks determine if all of the test cases planned for execution are actually relevant tests in the context of the current state of the satellite system 10. For example, certain tests depend of the (patch) version of the satellite, i.e., on the availability of a given feature provided by the patch for which parameters are to be checked. In such an instance, the pre-checks ensure that the related test cases are only executed if the patch is installed. This practice avoids (currently) irrelevant tests and, therefore, prevents unnecessary consumption of processing resources. After running the planned and relevant test cases (executed in form of programs coded in corresponding test case classes) on the satellites, it is possible to initiate a post-check on the total set of results. The post-check is adapted to evaluate all the results of the test cases on the respective satellite system 10. The post-checking module analyzes interdependencies of test case results. For example, a first and second setting of two different configuration parameters may result in further requirements for a third configuration parameter, because of interdependencies of first, second and third configuration parameter. The results of the test cases are consolidated by engine 11 and are sent back to the dispatcher 14. It is also possible to store the results in the result data base 21.

Figure 5:
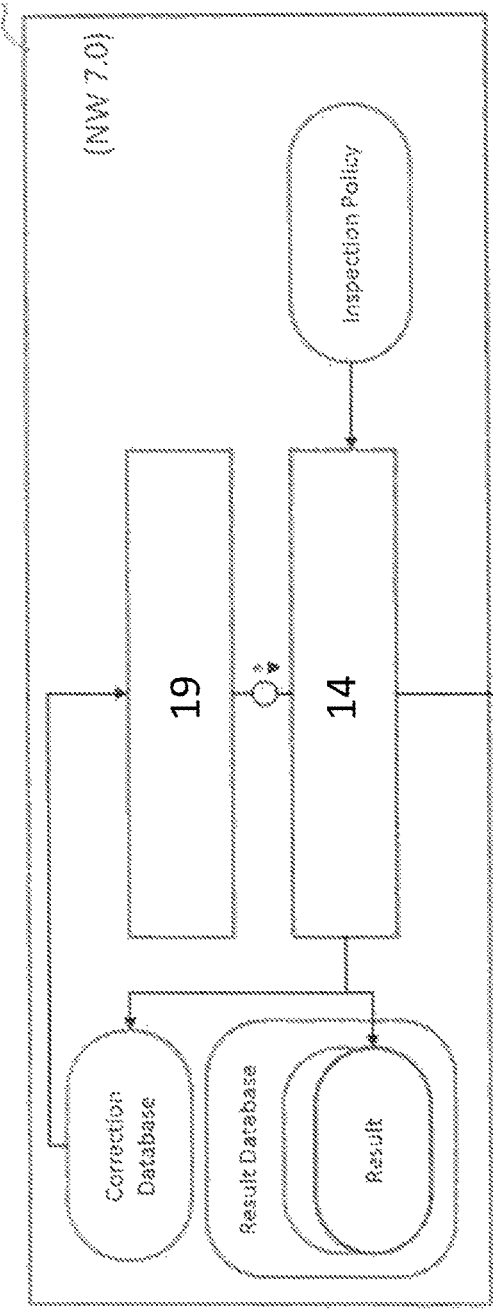
FIG. 5 is a block diagram for a correction run according to a preferred embodiment of present invention.
Figure 5:
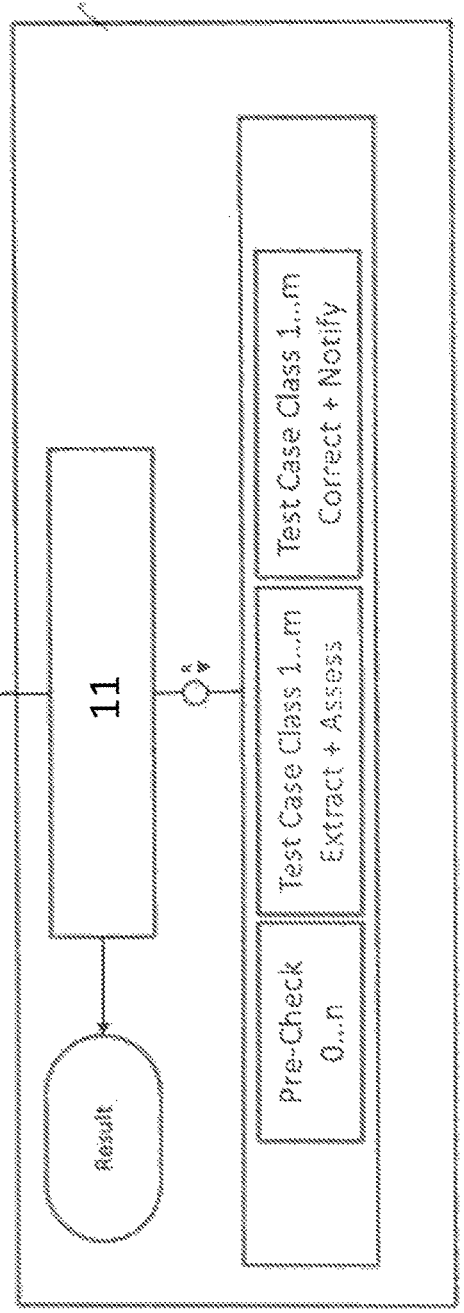

In case a correction is to be executed, it is referred to FIG. 5. In FIG. 5, it can be seen that, based on the results of the satellite system 10 the correction database 20 is accessed for initiating an automatic correction of the respective findings. This is done by sending a message with correction instructions to the satellite system which are to be executed by engine 11. In this case, the satellite system is, for instance, a SAP Basis System 7.1.

The inspection policies are maintained centrally, including all necessary data and configuration to assess a test case. The inspection policy may comprise a threshold, minimum/maximum values, reference values for the configuration parameters, lists of exceptions, and temporary and permanent rejections of findings.

An evaluation of the respective findings may be executed on the satellite system 10 itself. Therefore, it is not necessary to transfer a complete data extraction for each test case. As an advantage, less network resources may be required, because it is possible to transfer an extract (no bulk data) in order to explain the finding.

The correction procedure is always executed based on the current inspection policy. As a consequence, if the inspection policy is amended (which is also possible during operation of the system), the correction run will be amended, too. The automatic correction is always based on the latest correction back log (finding database), which is updated by the inspections.

Figure 6:
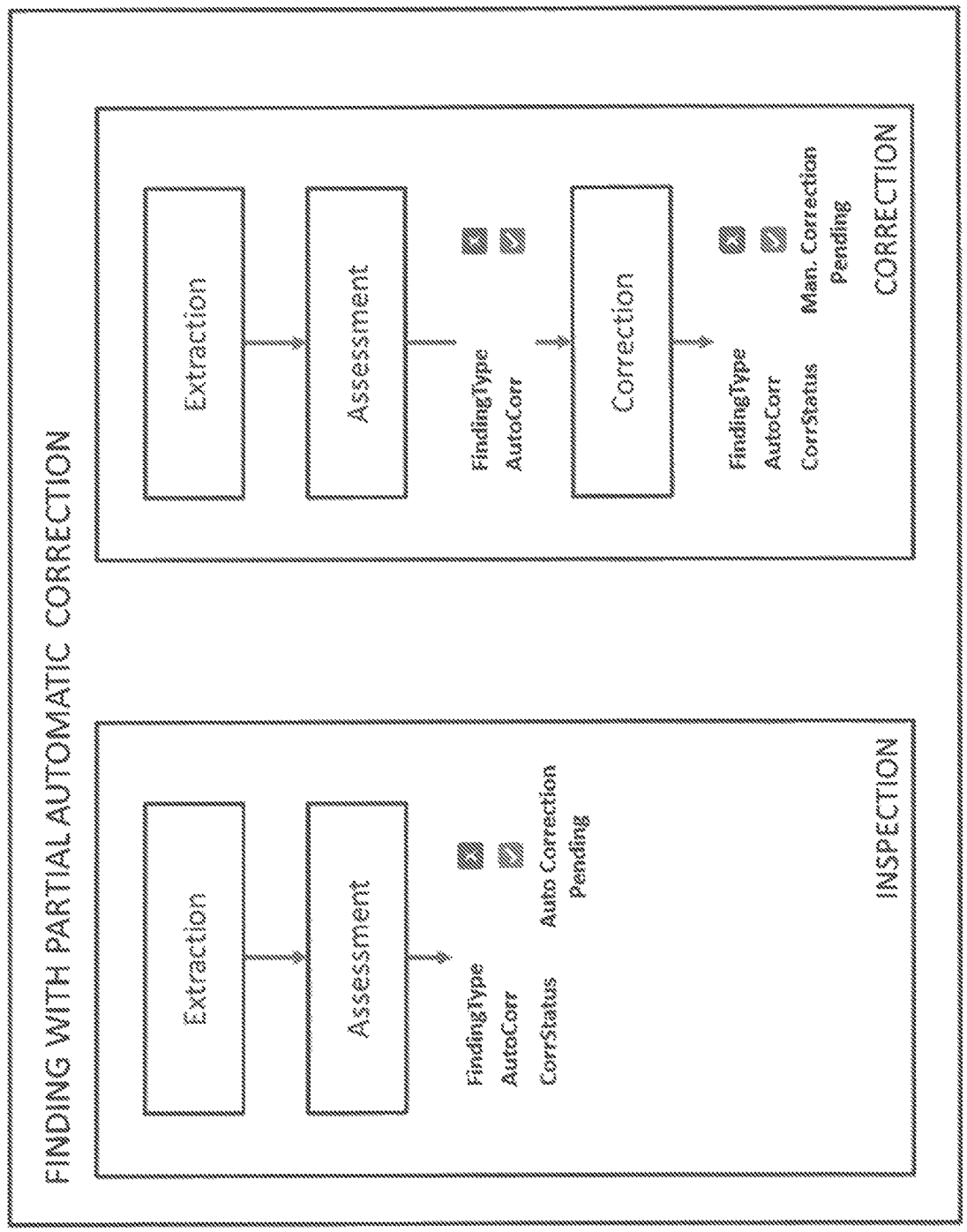
FIG. 6 is a block diagram for findings and a partial automatic correction run and FIG. 7 is a block diagram for findings and a full automatic correction run.

FIG. 6 shows a schematic overview of the handling of a finding with partial automatic correction. On the left-hand side, there is depicted the inspection which refers to the measurement of the configuration parameters on the satellite system 10. After the configuration parameters have been extracted, an assessment is executed. On a graphical user interface a correction status is displayed (here: "auto-correction pending"). On the right-hand side a correction procedure is depicted schematically. After extraction and evaluation or assessment of the respective findings, an automatic correction run is initiated. As described earlier, it is possible to output a list with findings (for instance, on the central server 12). Further, it is also possible to receive a verification signal from a user on a graphical user interface which serves to confirm that the user has been informed about the findings and verifies the automatic correction procedure on the satellite system 10. In response to receiving the user's verification signal, the automatic correction run is initiated.

Figure 7:
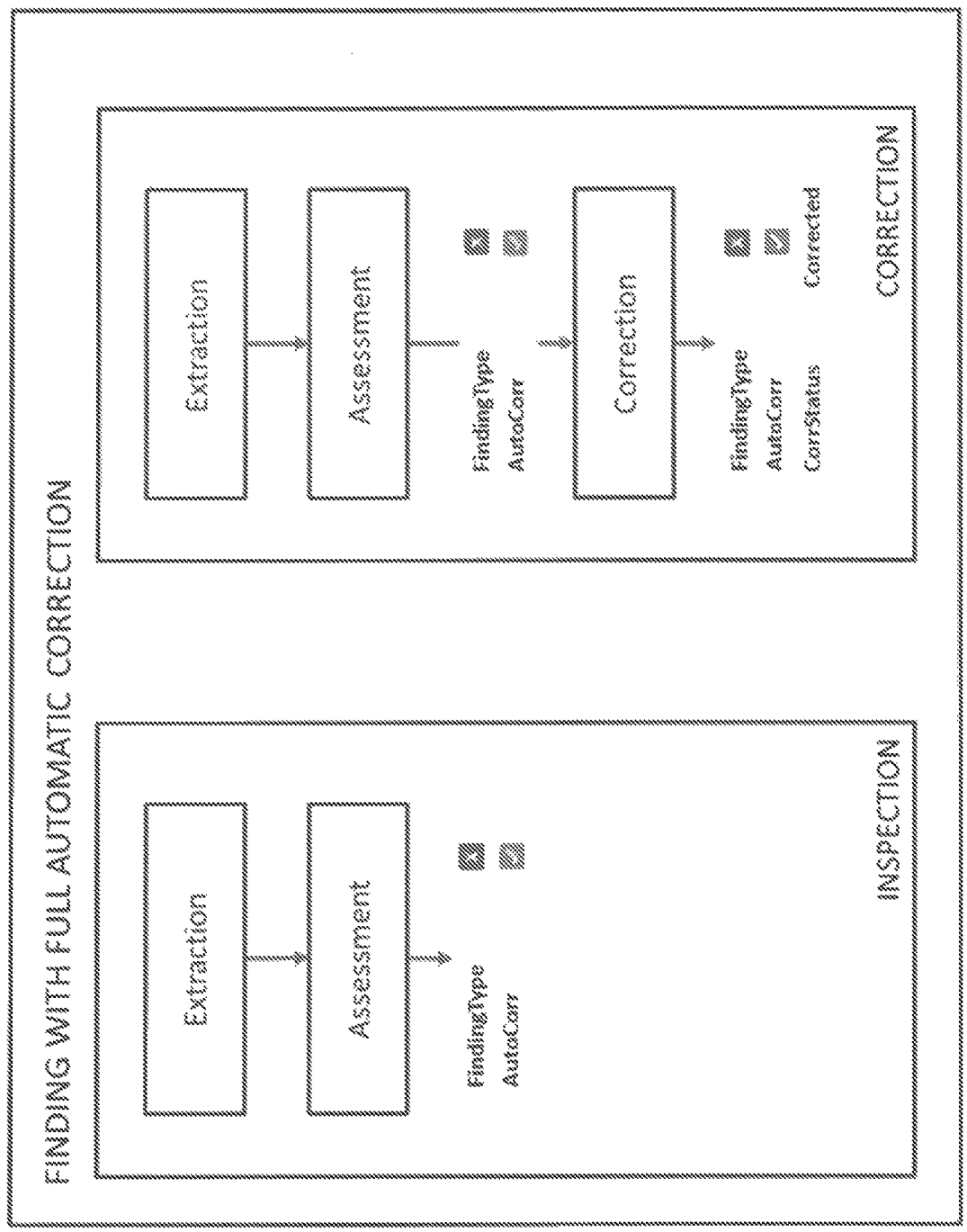

FIG. 7 shows a schematic overview of the handling of a finding with full automatic correction. For the principles of FIG. 7 it is referred to the description above relating to FIG. 6. The difference is to be seen in that the correction run is a full automatic correction run. After the correction run a message or signal is outputted in the user interface showing the status "corrected" in order to inform the user. Similar to FIG. 6, on the left-hand side, there is depicted the inspection which refers to the measurement of the configuration parameters on the satellite system 10. After the configuration parameters have been extracted, an assessment and correction is executed.

The meaning of specific details should be construed as examples within the embodiments and are not exhaustive or limiting the invention to the precise forms disclosed within the examples. One skilled in the relevant art will recognize that the invention can also be practiced without one or more of the specific details or with other methods, implementations, modules, entities, datasets, etc. In other instances, well-known structures, computer-related functions or operations are not shown or described in detail, as they will be understood by those skilled in the art.

The discussion above is intended to provide a brief, general description of a suitable computing environment (which might be of different kind like a client-server architecture or a internet/browser network) in which the invention may be implemented. The invention will be described in general context of computer-executable instructions, such as software modules, which might be executed in combination with hardware modules, being executed by different computers in the network environment. Generally, program modules or software modules include routines, programs, objects, classes, instances, components, data structures, etc., that perform particular tasks or implement particular abstract data types. Computer-executable instructions, associated data structures and program modules represent examples of the program code means for executing steps of the method described herein. The particular sequence of such executable instructions, method steps or associated data structures only represent examples of corresponding activities for implementing the functions described therein. It is also possible to execute the method iteratively.

Those skilled in the art will appreciate that the invention may be practiced in a network computing environment with many types of computer system configurations, including personal computers (PC), hand-held devices (for example, smartphones), multi-processor systems, microprocessor-based programmable consumer electronics, network PCs, minicomputers, mainframe computers, laptops and the like. Further, the invention may be practiced in distributed computing environments where computer-related tasks are performed by local or remote processing devices that are linked (either by hardwired links, wireless links or by a combination of hardwired or wireless links) through a communications network. In a distributed computing environment, program modules may be located in local or remote devices, memory systems, retrievals or data storages.

Generally, the method according to the invention may be executed on one single computer or on several computers that are linked over a network. The computers may be general purpose computing devices in the form a conventional computer, including a processing unit, a system memory, and a system bus that couples various system components including system memory to the processing unit. The system bus may be any one of several types of bus structures including a memory bus or a memory controller, a peripheral bus and a local bus using any of a variety of bus architectures, possibly such which will be used in clinical/medical system environments. The system memory includes read-only memory (ROM) and random access memories (RAM). A basic input/output system (BIOS), containing the basic routines that have the functionality to transfer information between elements within the computer, such as during start-up, may be stored in one memory. Additionally, the computer may also include hard disc drives and other interfaces for user interaction. The drives and their associated computer-readable media provide non-volatile or volatile storage of computer executable instructions, data structures, program modules and related data items. A user interface may be a keyboard, a pointing device or other input devices (not shown in the figures), such as a microphone, a joystick, a mouse. Additionally, interfaces to other systems might be used. These and other input devices are often connected to the processing unit through a serial port interface coupled to system bus. Other interfaces include a universal serial bus (USB). Moreover, a monitor or another display device is also connected to the computers of the system via an interface, such as video adapter. In addition to the monitor, the computers typically include other peripheral output or input devices (not shown), such as speakers and printers or interfaces for data exchange. Local and remote computer are coupled to each other by logical and physical connections, which may include a server, a router, a network interface, a peer device or other common network nodes. The connections might be local area network connections (LAN) and wide area network connections (WAN) which could be used within intranet or internet. Additionally, a networking environment typically includes a modem, a wireless link or any other means for establishing communications over the network.

Moreover, the network typically comprises means for data retrieval, particularly for accessing data storage means like repositories, etc. Network data exchange may be coupled by means of the use of proxies and other servers.

The example embodiments are to be considered in all respects only as illustrative and not restrictive. The scope of the invention is, therefore, indicated by the appended claims rather than by this description. All changes which come within the meaning and range of equivalency of the claims are to be embraced within their scope.

The invention claimed is:

1. In an enterprise resource planning (ERP) system, a computer system for transforming a plurality of database systems each included with a respective one of a plurality of satellite systems, comprising:
at least one central server and
at least one satellite system with an engine for measuring a plurality of configuration parameters for a database configuration and for executing generated correction instructions
a database internal network connection between the central server and the at least one satellite system,
wherein the central server comprises:
A measurement input interface for detecting configuration parameters that configure at least one of the satellite systems, wherein the configuration parameters specify how at least one of said plurality of data systems on said at least one of said satellite systems are configured,
A test input interface for receiving test data associated with at least one of the satellite systems,
An analyzer for receiving said detected configurations parameters from said at least one of the satellite systems, prior to identification that an error is included in said configuration parameters, and for analyzing the received configuration parameters from said at least one of the satellite systems with respect to the received test data to determine if any of said configuration parameters includes said error,
A correction module for generating correction instructions for correcting said error if said analyzing identifies said error in said configuration parameters and for transferring the correction instructions from said central server in order to correct said error,
wherein the measurement input interface, the analyzer and the correction module exchange data by a database internal interface (API).

2. A computer system according to claim 1, wherein said receiving is by a central server and said analyzing is by said central server.

3. A method for transforming a database system, wherein an enterprise resource planning (ERP) system is transformed as the database system with a central server and at least one satellite system in a secure and stable configuration state comprising:
detecting configuration parameters that configure at least one of the satellite systems, wherein the configuration parameters specify how at least one of said plurality of data systems on said at least one of said satellite systems are configured,
Providing a test input interface for receiving test data,
receiving said detected configuration parameters from said at least one of the satellite systems, prior to identification that an error is included in said configuration parameters,
analyzing the received configuration parameters from said at least one of the satellite systems with respect to the received test data to determine if any of said configuration parameters includes said error,
generating correction instructions for correcting said error if said analyzing identifies said error in said configuration parameters and
transferring the correction instructions from said central server in order to correct said error.

4. A method according to claim 3, wherein said receiving is by a central server and said analyzing is by said central server.

5. In an enterprise resource planning (ERP) system, a computer implemented method for transforming a plurality of database systems each included with a respective one of a plurality of satellite systems, said method comprising the steps of:
detecting configuration parameters that configure at least one of the satellite systems, wherein the configuration parameters specify how at least one of said plurality of database systems on said at least one of said satellite systems are configured
receiving said detected configuration parameters from said at least one of the satellite systems, prior to identifying that an error is included in said configuration parameters;
receiving test data associated with at least one of the satellite systems,
analyzing the received configuration parameters from said at least one of the satellite systems with respect to the received test data to determine if any of said configuration parameters includes said error;

generating correction instructions for correcting said error if said analyzing identifies said error in said configuration parameters;

transferring the correction instructions from said central server in order to correct said error.

6. The computer implemented method according to claim 5, wherein the test data comprise a set of pre-defined test cases, which are dynamically adaptable to the specific use case or extendable.

7. The computer implemented method according to claim 5, wherein an intermediate result of the analysis is outputted, wherein the intermediate result comprises a list of findings.

8. The computer implemented method according to claim 5, wherein the method further comprises:

Providing a pre-checking module for evaluating a relevance of a specific test case for a specific satellite.

9. The computer implemented method according to claim 5, wherein the method further comprises:

Providing a post-checking module for identifying and rating interdependency issues that arise in case a combination of different individual findings creates a further problem.

10. The computer implemented method according to claim 5, wherein the test data comprise the tests to be executed, data to customize a test scope and a correction scope and pre-defined criteria, rules and target values for the configuration parameters.

11. The computer implemented method according to claim 5, wherein automatically correcting configuration parameters comprises generating concrete mitigation instructions for the respective configuration parameter to be performed on the satellite system.

12. The computer implemented method according to claim 5, wherein configuration parameters do not relate to custom ABAP code and are selected from the group consisting of:

Network connection parameters
SAP graphical user interface parameters
Password management parameters
Encryption of network communication parameters, comprising SAP protocols and Web Protocols
Service parameters
Remote function call parameters
User authorization parameters
System setup parameters
Log configuration parameters
Operating system configuration parameters
SAP security patch parameters.

13. The computer implemented method according to claim 5, wherein the intermediate result may be verified before being automatically executed on the respective satellite.

14. The computer implemented method according to claim 5, wherein the intermediate result may be evaluated and prioritized by a user or automatically based on the pre-defined criteria and rules before transferring the database software system in the secure configuration state.

15. The computer implemented method according to claim 5, wherein data exchange between the central server and the distributed satellites for analyzing and automatically correcting the configuration state is integrated in the database system, particularly in a standardized transport management system.

16. The computer implemented method according to claim 5, wherein a result of the secure configuration state transformation is outputted.

17. The computer implemented method according to claim 5, wherein a result of the secure configuration state transformation is sent as a result message to defined recipients.

18. The computer implemented method according to claim 5, wherein all processes with respect to the secure configuration state transformation are logged in at least one log file.

19. The computer implemented method according to claim 5, wherein the secure configuration state transformation or a result of the secure configuration state transformation is administered in a central monitoring module.

20. The computer implemented method according to claim 5, wherein the secure configuration state transformation or a result of the secure configuration state transformation is evaluated in a monitoring module.

21. The computer implemented method according to claim 5, wherein the result additionally comprises a text file for manual correction instructions.

22. The computer implemented method according to claim 5, wherein identifiable quality defects are selected from the group consisting of:

Critical, inconsistent or incorrect configuration parameters, particularly critical configuration profile parameters or configuration parameters with respect to authorizations of users for specific functionalities and/or access to specific data;
Critical interdependencies between individual configuration
Configuration parameters negatively affecting security of the database software system
Configuration parameters leading to a performance reduction lower than a pre-determined lower performance threshold;
Configuration parameters affecting robustness of the database software system and
Configuration parameters affecting maintenance of the database software system.

23. The computer implemented method according to claim 5, wherein measuring the plurality of configuration parameters is executed by processes selected from the group consisting of: reading out configuration parameters out of the main memory, using at least one application program interface (API) and using a communication protocol of an SAP system.

24. The computer implemented method according to claim 5, wherein the database is an SAP database and the method is integrated in the SAP system and uses SAP database infrastructure.

25. The computer implemented method according to claim 5, wherein the method interacts with a middleware platform, particularly with a SAP NetWeaver Platform.

26. The computer implemented method according to claim 5, wherein the method is implemented in ABAP or in Java.

27. A method according to claim 5, wherein said receiving is by a central server and said analyzing is by said central server.

* * * * *